Aug. 19, 1941.    L. R. WILLIAMSON    2,252,906
CLUTCH AND BRAKE MECHANISM
Filed April 21, 1939    2 Sheets-Sheet 1

INVENTOR.
LARKIN R. WILLIAMSON
BY Horace B. Fay
ATTORNEY.

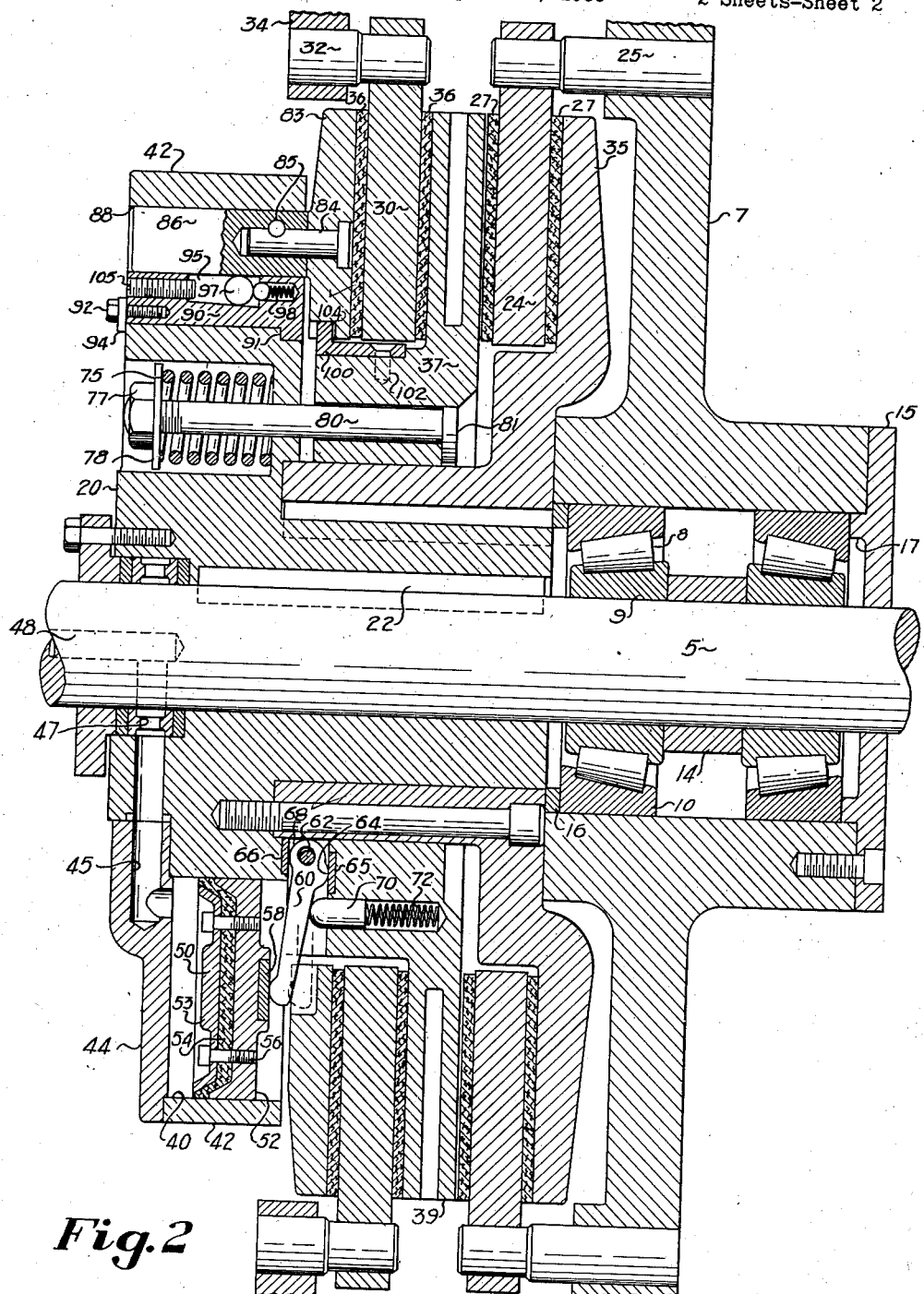

Patented Aug. 19, 1941

2,252,906

UNITED STATES PATENT OFFICE 2,252,906

CLUTCH AND BRAKE MECHANISM

Larkin R. Williamson, Brooklyn, N. Y., assignor to E. W. Bliss Company, Brooklyn, N. Y., a corporation of Delaware Application April 21, 1939, Serial No. 269,184

19 Claims. (Cl. 192—18)

This invention relates to a clutch and brake mechanism of the type used to control machine tools and the like and is more particularly directed to a construction in which the parts are of simplified manufacture.

Clutch and brake combinations are very old and comprise a clutch unit and a brake unit provided as an integral mechanism. The friction faces comprising the clutch and brake units are necessarily subjected to wear due to constant engagement of the parts while traveling at different rotative speeds. It has heretofore been necessary to periodically adjust the mechanism to compensate for this wear. Apparatus of this type heretofore used, especially when air operated, has required a relatively high fluid pressure to effect the desired rapid engagement of the parts.

It has been the general object of my invention to provide a friction drive mechanism embodying either, or both, a clutch and brake in which wear of the parts is automatically compensated for without the necessity of manual adjustment. Still another object of my invention has been to devise mechanism for applying clutch actuating force in such manner that it is multiplied before it reaches the parts it moves to engage. An additional object of my invention has been to provide a neat and compact clutch and brake unit in which various movable mechanisms are easily accessible.

Various other objects of the invention will become apparent from the following specification when read in the light of the accompanying drawings, and the essential features are summarized in the claims.

In said annexed drawings:

Fig. 2 is a section through Fig. 1 as indicated by the lines 2—2 thereon.

Figure 1:
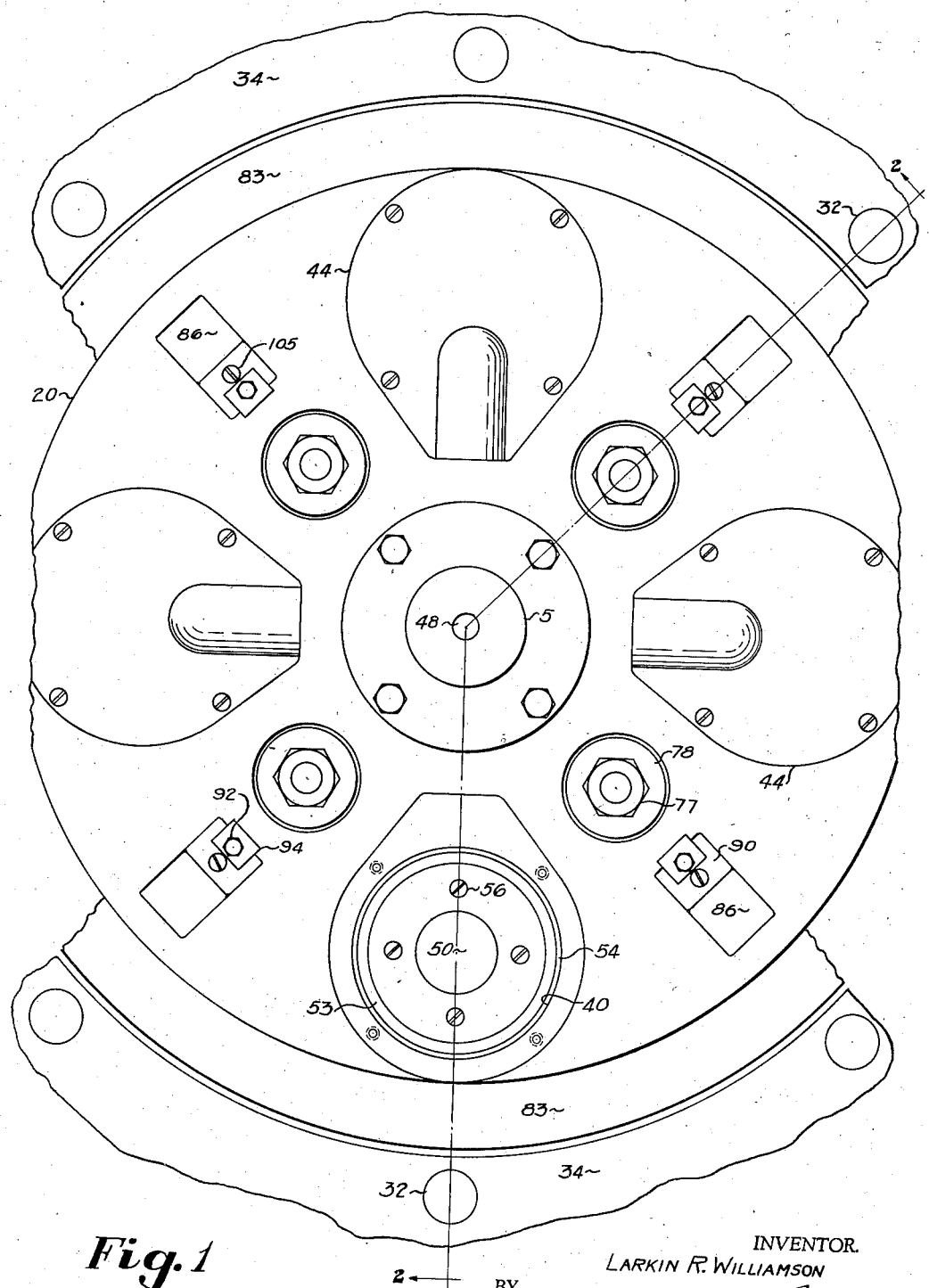
Fig. 1 is an end elevation transversely of the operating shaft.

Referring more particularly to Fig. 2, I provide a shaft 5 which supports the clutch and brake parts and transmits the drive to the machine tool, or the like, which is driven thereby. It will be apparent that there are many uses for my invention and that the same is not limited in application to any particular situation.

A driving pulley 7 is supported on tapered roller bearings 8 to rotate idly on the shaft 5. These bearings each comprise an inner race 9 fixed to the shaft and an outer race 10 fixed to the pulley wheel and intermediate roller 12, all of usual construction and well known in the art. The inner races are separated from each other by sleeve 14, and the outer races are positioned by a narrow sleeve 16 and a cap 15 carrying a race engaging shoulder 17.

The pulley wheel 7, not completely shown, is normally grooved at its outer periphery to receive a series of V-belts by which it is driven from a suitable source of power, as an electric motor. In many machine tools the driving force is applied intermittently and, under these conditions, the wheel 7 is usually of sufficient weight to act as a flywheel. Thus the mass of the wheel actually does the work and the motor is employed to maintain the wheel at speed.

A cage 20 is keyed to the shaft 5 by a key 22 and thus rotates therewith. The cage supports the pistons and spring mechanism and the clutch engaging flanged member hereinafter described.

A clutch plate 24 is supported on a series of pins 25, which are received in the pulley wheel 7 and is axially slidable along the pins. The plate is provided with friction surfaces 27 on each side thereof by which frictional drive with the shaft is effected.

A brake unit is embodied in my invention and this comprises a brake plate 30, identical with the clutch plate 24, and axially slidably supported on pins 32 which are received in a member 34 integral with the housing supporting the unit. Frictional facing 36 is provided on each side of the plate 30 by which engagement of the driven shaft 5 with the frame member 34 to provide a brake is accomplished.

The cage 20, heretofore mentioned, includes a vertical flange portion 35 secured thereto and interposed between the clutch plate 24 and the wheel 7 and including a face adjacent the plate to cooperate therewith during clutch engagement.

A flanged member 37 is slidably mounted on the cage 20 and rotates therewith and is shiftable axially to engage the clutch or the brake. This member comprises a radial portion 39, one face of which cooperates with the flange 35 to frictionally engage the clutch plate 24 and drive the shaft 5, as hereinafter described.

The member 37 in engaging the clutch is shifted to the right (Fig. 2) by a fluid pressure system, now to be described. Four cylinders 40 are formed in an outwardly extending portion 42 of the cage 20 and are spaced 90° apart. Each cylinder is provided with a cap 44 having a passage 45 which communicates with a similar passage in the cage. The cage passage in turn leads to an annular passage 47 communicating with a drilled opening 48 in the shaft 5. Fluid pressure, preferably air, is applied to the hole 48 in a well known manner and thence passes to the cylinders.

A piston 50 is slidably received in each cylinder and is shiftable axially of the shaft. Each piston comprises a ring part 52 and a cap 53 between which is held packing 54 by bolts 56. A hardened plate 58 is inserted in each piston to transmit the thrust of the piston to the member 37.

Radially disposed levers 60 are pivotally mounted on 62. These pins extend across the region occupied by the piston shifting mechanism and are supported in radially extending ears (not shown) of the cage 20. A nub 64 on each lever engages a hardened wear receiving plate 65 on the member 37. The pivoted connection 62 is so loose that it does not receive any of the thrust on the lever when the pistons are moved to the right (Fig. 2). Rather a hardened plate 66 in the cage acts as a fulcrum to allow the movement of the pistons 50 to be transmitted to the plates 65 of the member 37, shifting the same to the right (Fig. 2). This fulcrum or rocking action is produced by a surface 68 of the lever 60, which surface is rounded about the pin 62 or substantially cylindrical and coaxial with the pin 62. Thus line contact rather than surface contact is had between the plate 66 and the surface 68.

As the pistons are shifted, it will be noted that the force transmitted through the lever 60 is multiplied in a manner proportionate to the distances between the point of engagement of the piston and the fulcrum 66 and the point of engagement with the member 37 and the fulcrum. Thus the force applied is greatly increased by the levers, although the amount of travel of the member 37 is proportionately lowered.

To maintain the lever against the pistons 50 and avoid rattling of the parts and also prevent locking of the member 37 against return movement, pins 70 are mounted in axial holes in the cage and are spring urged as at 72 against respective levers.

The clutch is released and the brake applied after the work stroke of the shaft 5 is accomplished, and to this end, the air pressure behind the pistons 50 is released, which allows it to return to the left (Fig. 2) and allows a similar leftward movement of the member 37.

To positively shift this member from engagement with the clutch to a position where it will engage the brake, four heavy springs 75, located radially between the pistons 50, are provided. Each spring bears at one end against the extension 42 of the cage and at the other end against a nut and washer 77 and 78 of a bolt 80 which passes through the opposite side of the member 37. A head 81 on the bolt results in positive movement of the member 37 to the left when the air pressure is released by reason of the force applied through the springs 75. The bolt head 81 is flattened on one side and engages the member 37 to prevent its rotation and thereby allow adjustment of the nut 77.

When the member 37 moves to the left (Fig. 2), it cooperates with a brake flange 83 adjustably carried by the cage extension 42 in a manner hereinafter described. As a result the brake plate is clamped and the shaft is held against rotation, while at the same time the clutch plate 24 is released and the pulley wheel may continue to turn.

The plate 83 is keyed by pins 84 and cross pins 85 to four square hardened steel blocks 86 which are slidably received in broached openings 88. Each opening also accommodates a locking unit comprising a hardened steel piece 90 which is provided with a flange 91 to prevent its movement to the left (Fig. 2), even under great load. Movement to the right is prevented by a bolt 92 and a washer member 94.

Each piece 90 is recessed at 95 to provide a tapered opening in which is carried a hardened roller 97 normally urged toward the left by a ball and spring construction 98.

From the description thus far, it will be apparent that any attempt to move the plate 83 to the left (Fig. 2) will result in locking the hardened steel blocks 86 by reason of the rollers 97 and the tapered bottom of the recesses 95.

The plate 83 is drawn to the right to maintain the proper distance between the parts (Fig. 2) to compensate for wear in any of the friction faces. This is accomplished by an annular flanged band 100 bolted at 102 to the member 37. The flange of the band engages with a mating flange on the plate 83, as shown in Fig. 2. When the brake is engaged, the two flanges just mentioned are axially separated in an amount 104 equivalent to the distance traveled by the member 37 in releasing the brake and engaging the clutch.

When the parts have worn sufficiently, the band 100 will pull the brake plate 83 slightly to the right as it in turn is actuated by the pistons. This automatically adjusts the parts because all are axially slidable and hence free to adjust themselves with respect to each other. Return movement of the plate 83 is positively prevented by the locking action of the four rollers 97 with the four blocks 86. It thus follows that the mechanism will periodically automatically adjust itself, thus eliminating the necessity for frequent inspection and accompanying manual adjustment to keep the unit from slipping during operation.

It is occasionally necessary to dismantle the unit and at this time it may be desirable to return the brake plate 83 to its initial position. In this event, the headless screw 105 is turned in far enough to push the respective rollers 97 out of locking engagement with the blocks 86.

From the foregoing description, it will be seen that I have provided an improved clutch and brake construction embodying several novel features. The chief of these are to automatically compensate for wear in the parts and to multiply the engaging force from the fluid line as it is transmitted to the friction plates engaged thereby.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In apparatus of the class described, a frame, a shaft rotatable with respect thereto, a pair of friction members carried by and locked against rotation with respect to said shaft, a friction member locked to said frame, all of said members being adapted to be engaged with and disengaged from each other, means to engage and disengage all of said members and means to maintain a predetermined spacing between said pair of members when they are in a disengaged position to automatically compensate for wear in said pair of members.

2 In apparatus of the class described, a pair of friction members mounted for rotation, a stationary friction member adapted to be engaged with and disengaged from said pair of members and means to maintain a predetermined spacing between said pair of members when they are in a disengaged position to automatically compensate for wear in said pair of members.

3. In apparatus of the class described, a frame, a shaft rotatable with respect to said frame, a pair of friction members movable axially with respect to and rotatable with said shaft, a friction brake member stationary with respect to said frame, means to engage all of said members to thereby brake said shaft and then to disengage said members, and means to maintain a predetermined spacing between said pair of members when they are in a disengaged position to automatically compensate for wear in said members.

4. In mechanism of the class described, a frame, a shaft rotatable with respect thereto, a pair of friction members rotatable with said shaft and a friction member which is subject to wear stationary with respect to said frame, means to engage all of said members, and means to periodically adjust the disengaged distance between said pair of members to automatically compensate for wear of said members.

5. A friction drive member comprising a shaft, a cage rotatable with said shaft, a plurality of members with friction surfaces adapted to be engaged and disengaged, an engaging member axially slidable on said cage to engage and disengage said surfaces, a flange member carried by said cage and adapted to cooperate with said engaging member to engage said friction surfaces, means cooperating with said engaging member to move said flange member therewith in one direction to compensate for wear in said friction surfaces, and means to limit the movement of said flange member in the reverse direction.

6. A friction drive member comprising a shaft, a cage rotatable with said shaft, a plurality of members with friction surfaces adapted to be engaged and disengaged, an engaging member axially slidable on said cage to engage and disengage said surfaces, a pin projecting from said cage, a lever freely pivotable about said pin interposed between said cage and said engaging member to shift said engaging member, said lever having a surface parallel with the axis of said pin and contacting said cage whereby said pin counteracts only part of the forces transmitted through said lever, and means to act on said lever at such a point as to increase the force applied to said engaging member over the force applied to said lever.

7. A friction drive member comprising a brake and a clutch, a shaft, a cage rotatable with said shaft, a plurality of friction surfaces comprising the clutch and a plurality of friction surfaces comprising the brake, an engaging member between the clutch and brake surfaces and axially slidable on said cage to engage and disengage said surfaces, a flange member carried by said cage and adapted to cooperate with said engaging member to engage one of said plurality of friction surfaces, means cooperating with said engaging member to move said flange member therewith in one direction to compensate for wear in said friction surfaces and means to limit the movement of said flange member in the reverse direction.

8. In apparatus of the class described comprising a shaft, a cage rotatable with said shaft, a plurality of members with friction surfaces adapted to be engaged and disengaged, an engaging member slidable with respect to the cage to engage and disengage said surfaces, a plurality of pistons in said cage, a plurality of levers pivotally carried by said cage, said levers each having an axial surface in contact with said cage, each of said levers engaging with said engaging member adjacent said pivot and with respective pistons at a point remote from the pivot, and means to actuate said pistons to shift said levers and thereby move said engaging member.

9. In apparatus of the class described comprising a shaft, a cage rotatable with said shaft, a plurality of members with friction surfaces adapted to be engaged and disengaged, an engaging member slidable with respect to the cage to engage and disengage said surfaces, a plurality of pistons in said cage, a plurality of levers pivotally carried by said cage adjacent the shaft axis and extending radially outwardly, each of said levers engaging with said member adjacent said pivot and with respective pistons at a point remote from the pivot, and means to actuate said pistons to shift said levers and thereby move said engaging member.

10. A friction drive member comprising a brake and a clutch, a shaft, a cage rotatable with said shaft, a plurality of friction surfaces comprising the clutch and a plurality of friction surfaces comprising the brake, a member slidable on the cage to engage and disengage said pluralities of surfaces respectively, a plurality of pistons in said cage movable parallel to the shaft axis, a plurality of levers pivotally carried by said cage adjacent the shaft axis and extending radially outwardly, each of said levers engaging with said member adjacent said pivot and with respective pistons at a point remote from the pivot, and means to actuate said pistons to shift said levers and thereby move said engaging member.

11. In apparatus of the class described, a shaft, a cage rotatable with said shaft, a brake frame, a brake plate mounted on said frame for axial sliding movement therewith, a driving member idly carried on said shaft, a clutch plate slidingly carried on said driving member, an engaging member slidable with respect to said cage with a flange adapted to lie between said clutch plate and said brake plate and shiftable from engagement with one to engagement with the other, a radial flange carried by said cage to cooperate with said engaging member to engage said clutch plate, a radial flange carried by said cage to cooperate with said engaging member to engage said brake plate, one of said radial flanges being slidably carried by said cage.

12. A friction drive member comprising a brake and a clutch, a shaft, a cage rotatable with said shaft, a brake frame, a brake plate mounted on said frame for axial sliding movement therewith, a driving member idly carried on said shaft, a clutch plate slidingly carried on said driving member, an engaging member slidable with respect to said cage with a flange adapted to lie between said clutch plate and said brake plate and shiftable from engagement with one to engagement with the other, a radial flange carried by said cage to cooperate with said engaging member to engage said clutch plate, a radial flange carried by said cage to cooperate with said engaging member to engage said brake plate, one of said radial flanges being slidably carried by said cage.

13. A friction drive member comprising a brake and a clutch, a shaft, a cage rotatable with said shaft, a brake frame, a brake plate mounted on said frame for axial sliding movement therewith, a driving member idly carried on said shaft, a clutch plate slidingly carried on said driving member, an engaging member slidably carried with respect to said cage with a flange adapted to lie between said clutch plate and said brake plate and shiftable from engagement with one to engagement with the other, a radial flange carried by said cage to cooperate with said engaging member to engage said clutch plate, a radial flange carried by said cage to cooperate with said engaging member to engage said brake plate, one of said radial flanges being slidably carried by said cage and means to periodically and automatically shift said slidably carried radial flange with respect to said engaging member to compensate for wear in the parts.

14. A friction drive member comprising a brake and a clutch, a shaft, a cage rotatable with said shaft, a brake frame, a brake plate mounted on said frame for axial sliding movement therewith, a driving member idly carried on said shaft, a clutch plate slidingly carried on said driving member, an engaging member slidably carried on said cage with a flange adapted to lie between said clutch plate and said brake plate and shiftable from engagement with one to engagement with the other, a radial flange carried by said cage to cooperate with said engaging member to engage said clutch plate, a radial flange carried by said cage to cooperate with said engaging member to engage said brake plate, one of said radial flanges being slidably carried by said cage and means interconnecting said slidably carried radial flange and said engaging member to shift the former with respect to said other radial flange.

15. A friction drive member comprising a brake and a clutch, a shaft, a cage rotatable with said shaft, a brake frame, a brake plate mounted on said frame for axial sliding movement therewith, a driving member idly carried on said shaft, a clutch plate slidingly carried on said driving member, an engaging member slidably carried by said cage with a flange adapted to lie between said clutch plate and said brake plate and shiftable from engagement with one to engagement with the other, a radial flange carried by said cage to cooperate with said engaging member to engage said clutch plate, a second radial flange carried by said cage to cooperate with said engaging member to engage said brake plate, one of said radial flanges being slidably carried by said cage, means interconnecting said slidably carried radial flange and said engaging member to shift the former with respect to said other radial flange in one direction and means to limit the movement of said slidably carried radial flange in the other direction.

16. A friction drive member comprising a brake and a clutch, a shaft, a cage rotatable with said shaft, a brake frame, a brake plate mounted on said frame for axial sliding movement therewith, a driving member idly carried on said shaft, a clutch plate slidingly carried on said driving member, an engaging member slidably carried by said cage with a flange adapted to lie between said clutch plate and said brake plate and shiftable from engagement with one to engagement with the other, a radial flange carried by said cage to cooperate with said engaging member to engage said clutch plate, a second radial flange carried by said cage to cooperate with said engaging member to engage said brake plate, one of said radial flanges being slidably carried by said cage, means interconnecting said slidably carried radial flange and said engaging member to shift the former with respect to the other radial flange in one direction and means to limit the movement of said slidably carried radial flange in the other direction, a plurality of pivotally carried levers adapted to bear against said cage and said engaging member, a plurality of pistons shiftable to engage and move said levers to shift said engaging member with respect to said cage and means to apply fluid pressure to said pistons to shift the same.

17. A friction drive mechanism comprising a brake and a clutch, a shaft, a cage rotatable with said shaft, a plurality of friction surfaces comprising one of the elements of the brake, an engaging member axially slidable with respect to said cage to engage and disengage said surfaces, a flange member carried by said cage and adapted to cooperate with said engaging member to engage said friction surfaces, means cooperating with said engaging member to move said flange member therewith in one direction to compensate for wear in said friction surfaces and means to limit the movement of said flange member in the reverse direction.

18. A friction drive mechanism comprising a shaft, a cage rotatable with said shaft, a plurality of members with friction surfaces adapted to be engaged and disengaged, an engaging member axially slidable on said cage to engage and disengage said surfaces, a pin projecting from said cage, a lever freely pivotable about said pin interposed between said cage and said engaging member to shift said engaging member, said lever having a surface parallel with the axis of said pin and contacting said cage whereby said pin counteracts only part of the forces transmitted through said lever.

19. A friction drive mechanism comprising a shaft, a cage rotatable with said shaft, a plurality of members with friction surfaces adapted to be engaged and disengaged, an engaging member axially slidable on said cage to engage and disengage said surfaces, a pin projecting from said cage, a lever freely pivotable about said pin interposed between said cage and said engaging member to shift said engaging member, said lever having a curved surface the center of which is substantially the axis of said pin and contacting said cage whereby said surface counteracts forces transmitted through said lever.

LARKIN R. WILLIAMSON.